(12) United States Patent
Lee (10) Patent No.: US 9,797,205 B2
(45) Date of Patent: Oct. 24, 2017

(54) COLLAPSIBLE WIRING CONDUIT FOR DOWNHOLE LINEAR ACTUATOR

(71) Applicant: HALLIBURTON ENERGY SERVICES, INC., Houston, TX (US)

(72) Inventor: Shao Hwa Lee, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/906,463

(22) PCT Filed: Mar. 9, 2015

(86) PCT No.: PCT/US2015/019471
§ 371 (c)(1),
(2) Date: Jan. 20, 2016

(87) PCT Pub. No.: WO2016/144317
PCT Pub. Date: Sep. 15, 2016

(65) Prior Publication Data
US 2017/0089150 A1    Mar. 30, 2017

(51) Int. Cl.
*F16L 3/015* (2006.01)
*E21B 17/20* (2006.01)

(52) U.S. Cl.
CPC .............. *E21B 17/20* (2013.01); *F16L 3/015* (2013.01)

(58) Field of Classification Search
CPC .... H02G 11/006; H02G 11/00; H02G 3/0475; H02G 3/0481; H02G 3/0487; F16G 13/16; Y10T 137/8807; F16L 3/015; E05Y 2400/654
See application file for complete search history.

(56) References Cited

U.S. PATENT DOCUMENTS

| | | | | |
|---|---|---|---|---|
| 2,706,616 A | * | 4/1955 | Osmun | E21B 17/003 174/68.1 |
| 3,670,930 A | * | 6/1972 | Irie | B67D 7/40 137/355.16 |
| 3,721,260 A | | 3/1973 | Stahmer | |

(Continued)

FOREIGN PATENT DOCUMENTS

DE    19928889    12/2000

OTHER PUBLICATIONS

International Patent Application No. PCT/US2015/019471, International Search Report and Written Opinion, mailed Nov. 25, 2015, 11 pages.

*Primary Examiner* — Kipp Wallace
(74) *Attorney, Agent, or Firm* — Kilpatrick Townsend & Stockton LLP (57) ABSTRACT

A collapsible wiring conduit can provide an extendable and retractable wired connection between moving components in a downhole tool, such as components moved relative to one another by a linear actuator. The collapsible wiring conduit can include links, hinges, stoppers, and wiring. The hinges can couple the links to one another. The links can be coupled end to end by the hinges. The stoppers can prevent the hinges from opening to or beyond a predetermined amount, such as preventing the hinges from opening to a 180-degree orientation. The wiring can be routed from link to link along the collapsible wiring conduit. In some aspects, the hinges are hollow, and the wiring is routed from link to link through the hollow hinges.

16 Claims, 7 Drawing Sheets

(56) References Cited

U.S. PATENT DOCUMENTS

| | | | |
|---|---|---|---|
| 3,848,361 A * | 11/1974 | Foster | E05D 11/0081 16/223 |
| 3,942,554 A | 3/1976 | Werner et al. | |
| 4,391,297 A | 7/1983 | Knight | |
| 4,392,344 A | 7/1983 | Gordon et al. | |
| 4,416,494 A * | 11/1983 | Watkins | E21B 17/003 175/45 |
| 4,800,714 A | 1/1989 | Moritz | |
| 5,038,556 A | 8/1991 | Moritz et al. | |
| 5,108,350 A | 4/1992 | Szpakowski | |
| 6,182,995 B1 | 2/2001 | Wall | |
| 6,350,956 B1 * | 2/2002 | Sakata | B60R 16/0215 16/221 |
| 6,374,589 B1 | 4/2002 | Kunert et al. | |
| 6,396,414 B1 * | 5/2002 | Bickford | H01B 7/065 174/47 |
| 6,484,801 B2 * | 11/2002 | Brewer | E21B 17/028 166/242.6 |
| 6,510,682 B2 | 1/2003 | Komiya et al. | |
| 6,941,974 B2 | 9/2005 | Utaki | |
| 6,992,254 B2 | 1/2006 | Komiya | |
| 7,243,486 B1 | 7/2007 | Ikeda et al. | |
| 7,617,669 B1 | 11/2009 | Komiya et al. | |
| 7,621,078 B2 | 11/2009 | Phelan et al. | |
| 7,849,667 B2 * | 12/2010 | Jaeker | F16G 13/16 248/49 |
| 8,387,763 B2 | 3/2013 | Burke et al. | |
| 8,448,382 B2 * | 5/2013 | Rodgers | E06B 7/28 49/167 |
| 8,549,831 B2 * | 10/2013 | Dunham | F16G 13/16 248/49 |
| 2008/0086854 A1 | 4/2008 | Boyd et al. | |
| 2008/0251291 A1 * | 10/2008 | Kadrnoska | H02G 3/0475 174/72 R |
| 2009/0065200 A1 | 3/2009 | Howard et al. | |
| 2011/0034257 A1 * | 2/2011 | Wen | F16C 1/26 464/173 |
| 2011/0287228 A1 | 11/2011 | Durney et al. | |
| 2013/0341471 A1 | 12/2013 | Yang et al. | |
| 2014/0042280 A1 | 2/2014 | Takeuchi et al. | |
| 2014/0124217 A1 | 5/2014 | Godager et al. | |
| 2014/0182262 A1 * | 7/2014 | Komiya | F16G 13/16 59/78.1 |

* cited by examiner

COLLAPSIBLE WIRING CONDUIT FOR DOWNHOLE LINEAR ACTUATOR

CROSS-REFERENCE TO RELATED APPLICATIONS

This is a U.S. national phase under 35 U.S.C. 371 of International Patent Application No. PCT/US2015/019471, titled "Collapsible Wiring Conduit for Downhole Linear Actuator" and filed Mar. 9, 2015, the entirety of which is incorporated herein by reference.

TECHNICAL FIELD

The present disclosure relates generally to devices for use in a wellbore in a subterranean formation and, more particularly (although not necessarily exclusively), to collapsible wiring conduits for linear actuators in wellbore tool strings.

BACKGROUND

Various devices can be placed in a well traversing a hydrocarbon-bearing subterranean formation. Some devices can include features that can be moved relative to one another, such as by a linear actuator. Moving features relative to one another can result in a variable distance between the features. Fixed wiring of a single length may be unsuitable for maintaining electrical connections between features separated by a variable distance. Use of stretchable wiring in lieu of fixed wiring of a single length can pose other challenges. For example, stretchable wiring may thermally set in a high temperature environment and prevent the wiring from subsequently expanding or contracting to span the variable distance.

DETAILED DESCRIPTION

Certain aspects and examples of the present disclosure are directed to collapsible wiring conduits. The collapsible wiring conduits can be used with linear actuators in a well system. For example, the collapsible wiring conduit can provide an extendable or retractable guide for a wiring connection between components that are repositionable relative to one another by a linear actuator. The collapsible wiring conduit can allow wiring to be predictably collapsed into a known space or volume and then expanded across a length between the repositionable parts (e.g., to electrically connect the repositionable parts when positioned nearest each other at a first end of a stroke of the linear actuator and to continue connecting the repositionable parts when positioned farthest from each other at an opposite end of the stroke of the linear actuator). The collapsible wiring conduit may provide a favorable extension ratio, allowing the wire to be stored in a volume having a longitudinal length significantly smaller than a length that the collapsible wiring conduit can extend in spanning the maximum distance between the repositionable parts.

In an example, the collapsible wiring conduit can include a series of links interconnected by hinges. The hinges can connect adjacent links in the series, such as at respective ends of the adjacent links. The hinges can allow the links to pivot relative to one another as the extreme ends of the series of links are pulled apart or pushed together. The linkage can resemble a saw tooth pattern when assembled, with small lateral distances between successive "teeth" of the saw tooth pattern in a collapsed condition, and with greater lateral distances between the teeth when the linkage is in an expanded condition. As the extreme ends of the series of links are pulled apart, the hinges in the series can open, allowing the links to spread apart and span the variable distance between repositionable parts. Stoppers can constrain the hinges and prevent the hinges from opening to or beyond a predetermined amount or position. For example, the stoppers may prevent the individual links from rotating to an arrangement in which a lateral pressure on the series of links may be insufficient to rotate the pairs of individual links back towards the collapsed condition. In an illustrative example, the stoppers can prevent the individual links from rotating to an arrangement in which pairs of adjacent links are at a 180-degree alignment relative to one another (for example, the stoppers may prevent the links from moving beyond a 170-degree alignment). Wiring can be routed through and along the links to provide a wired connection between parts moved by a linear actuator. The wiring may be routed through features of the links such as channels along a length of a link or through holes through the hinges that connect the links. The links can also include locks, walls, or other features that retain the wiring against or in the link.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "upper," "lower," "left," "right," "uphole," "downhole," etc. in relation to the illustrative aspects as they are depicted in the figures, the upper direction being toward the top of the corresponding figure and the lower direction being toward the bottom of the corresponding figure, the uphole direction being toward the surface of the well and the downhole direction being toward the toe of the well. Like the illustrative aspects, the numerals and directional descriptions included in the following should not be used to limit the present disclosure.

Figure 1:
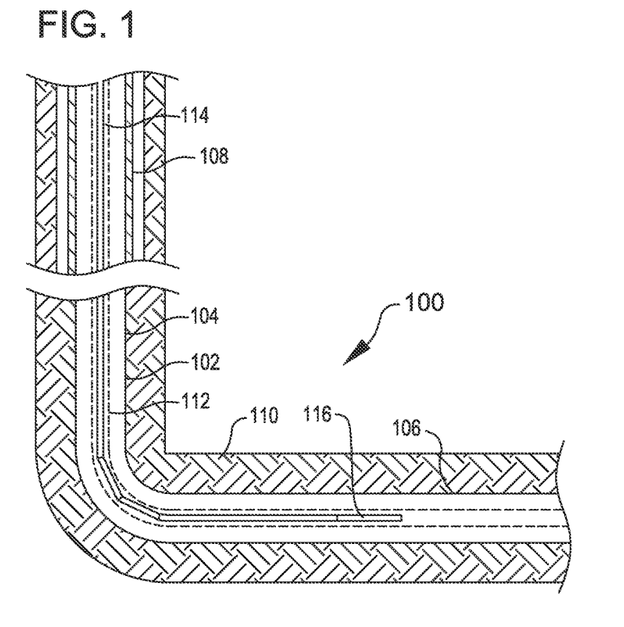
FIG. 1 is a schematic illustration of a well system including a tool string with a linear actuator according to aspects of the present disclosure.

FIG. 1 schematically depicts an example of a well system 100 having a tool string 114 with a linear actuator 116. The well system 100 can include a bore that is a wellbore 102 extending through various earth strata. The wellbore 102 can have a substantially vertical section 104 and a substantially horizontal section 106. The substantially vertical section 104 can include a casing string 108 cemented at an upper portion of the substantially vertical section 104. In some aspects, the casing string 108 can extend into the substantially horizontal section 106. The substantially horizontal section 106 (or the substantially vertical section 104 or both) can extend through a hydrocarbon bearing subterranean formation 110.

A tubing string 112 within the wellbore 102 can extend from the surface to the subterranean formation 110. The tubing string 112 can provide a conduit for formation fluids, such as production fluids produced from the subterranean formation 110, to travel from the substantially horizontal section 106 to the surface. Pressure from a bore in a subterranean formation 110 can cause formation fluids, including production fluids such as gas or petroleum, to flow to the surface.

The well system 100 can also include a tool string 114. The tool string 114 can be deployed into the tubing 112 or into a portion of the well system 100 other than the tubing 112, such as a portion of the well system 100 that does not include tubing 112. In one example, the tool string 114 can be a wire line tool string, such as a tool string used for operating well service tools within the wellbore 102. In some aspects, the tool string 114 can include an electronic cable for conveying communications or power (or both) to tools deployed on the tool string 114. The tool string 114 can be deployed from a surface of the well system 100.

The well system 100 can also include a linear actuator 116. The linear actuator 116 can include a collapsible wiring conduit. The collapsible wiring conduit can guide wiring between objects that are repositionable relative to one another by the linear actuator. The linear actuator 116 can be part of the tool string 114. Although the tool string 114 is depicted in FIG. 1 with one linear actuator 116 at a downhole end of the tool string 114, any number of linear actuators 116 can be used and may be located at any position along the tool string 114. For example, a linear actuator 116 can be located uphole or in the substantially vertical section 104 in addition to or as an alternative to the depicted location of the linear actuator 116 in the substantially horizontal section 106. In some aspects, the linear actuator 116 can be disposed in simpler wellbores, such as wellbores having only a substantially vertical section. The linear actuator 116 can be disposed in openhole environments, as depicted in FIG. 1, or in cased environments.

Figure 2:
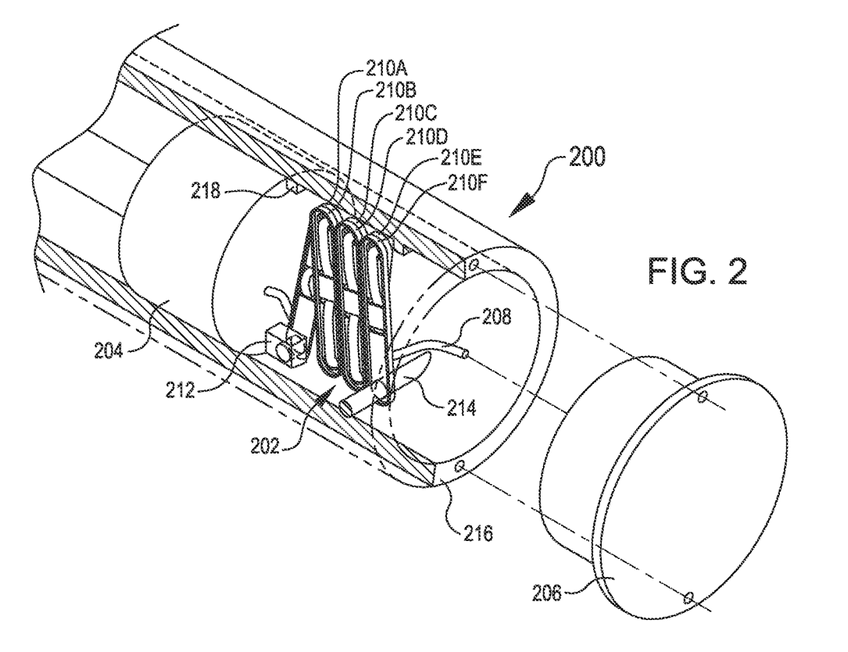
FIG. 2 is a perspective view of an example of a linear actuator having a collapsible wiring conduit according to certain aspects.

Different types of linear actuators 116 can be used in the well system 100 depicted in FIG. 1. For example, FIG. 2 is a perspective view of an example of a linear actuator 200 having a collapsible wiring conduit 202 according to some aspects. The linear actuator 200 can include a plunger 204 and a cap 206. Actuation of the linear actuator 200 can move the plunger 204 and the cap 206 toward each other, or alternatively, away from each other. For example, the linear actuator 200 may move the plunger 204 relative to the cap 206, or the linear actuator 200 may move the cap 206 relative to the plunger 204. In some aspects, a stroke of the linear actuator 200 changes a length between the plunger 204 and the cap 206. For example, a stroke length of the linear actuator 200 may be approximately equal to a length between minimum and maximum distances apart of the plunger 204 and the cap 206.

The collapsible wiring conduit 202 can provide an extendable or retractable guide for wiring 208. For example, the wiring 208 can be routed along the collapsible wiring conduit 202 and electrically connect the plunger 204 and the cap 206, such as for power transmission, data transmission, or some combination thereof.

The collapsible wiring conduit 202 can include links 210 (individually referenced in FIG. 2 as 210A-210F). Although the collapsible wiring conduit 202 is illustrated with six links 210A-210F, any number of links can be used. The links 210 can be coupled one to another in series. The links 210 can pivot relative to one another. The pivoting relationship of the links 210 can allow the collapsible wire conduit 202 to expand or contract according to changes in the length between the plunger 204 and the cap 206.

A first link 210A at a first end of the collapsible wiring conduit 202 can be coupled with a first end attachment 212 (shown as a block in FIG. 2). In some aspects, the first link 210A can pivot about the first end attachment 212. Similarly, a final link 210F at an opposite end of the collapsible wiring conduit 202 can be coupled with a second end attachment 214 (shown as a rod in FIG. 2). In some aspects, the final link 210F can pivot about the second end attachment 214.

The second end attachment 214 and the first end attachment 212 can be movable relative to one another. For example, the first end attachment 212 can be coupled with the plunger 204 (or an intervening structure) and move or remain stationary with the plunger 204, and the second end attachment 214 can be coupled with the cap 206 (or an intervening structure) and move or remain stationary with the cap 206. Movement of the first end attachment 212 and the second end attachment 214 toward or away from one another can cause links 210 to pivot relative to one another and change a length of the collapsible wiring conduit 202. This can allow the collapsible wiring conduit 202 to expand and contract along with the changes in length between the plunger 204 and the cap 206 and maintain connection of the wiring 208 through all positions along the stroke of the linear actuator 200.

The linear actuator 200 can also include a housing 216. Components of the linear actuator 200 including, but not limited to, the plunger 204, the cap 206, the wiring 208, the links 210, the first end attachment 212, and the second end attachment 214 can be positioned at least partially within the housing 216. The plunger 204 may be movable relative to the housing 216 by the actuation of the linear actuator 200. The cap 206 can be coupled with the housing 216. The cap 206 may include features for connecting the housing 216 to other portions of a tool string 114 depicted in FIG. 1. For example, the cap 206 may include a key operating assembly for operating valves through the tool string 114. Additionally or alternatively, the cap 206 can include other components utilizing data transmission, power transmission, or both. Although the cap 206 is depicted in FIG. 2 as a component that attaches to an end of the housing 216, the cap 206 can be positioned anywhere along the length of the housing 216. The cap 206 may also be a component positioned partially or fully within the housing 216.

Changing a length of the collapsible wiring conduit 202 can involve moving the collapsible wiring conduit 202 toward a collapsed condition or toward an expanded condition. In some aspects, the collapsible wiring conduit 202 can move freely between the expanded and the collapsed condition, such as retracting to a collapsed condition shown in FIG. 3 or extending to an expanded condition in FIG. 4.

Figure 3:
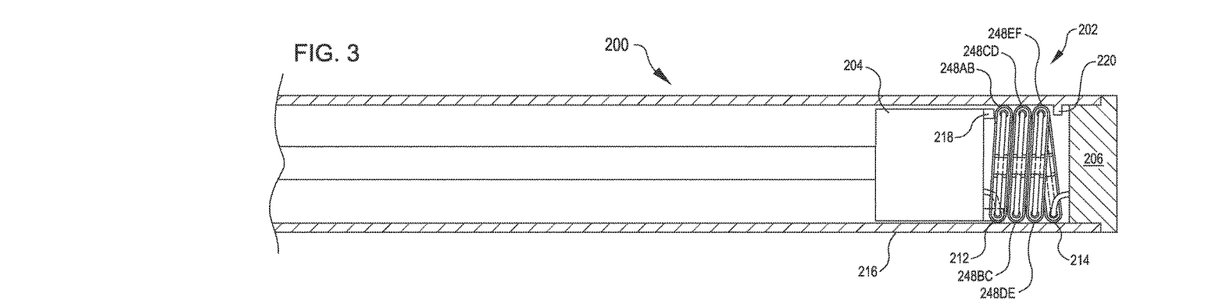
FIG. 3 is a side view of the linear actuator of FIG. 2 with the collapsible wiring conduit in a collapsed condition according to certain aspects.

FIG. 3 is a side view of the linear actuator 200 of FIG. 2 with the collapsible wiring conduit 202 in a collapsed condition. In the collapsed condition, the links 210 can be oriented generally transverse to a longitudinal axis of the housing 216.

The collapsible wiring conduit 202 can include hinges 248 (individually referenced as 248AB, 248BC, 248CD etc. in FIG. 3). Each hinge 248 can couple a pair of links 210 that are adjacent to—or next to—one another in the series of links 210. For example, one hinge 248AB (FIG. 3) can couple a first link 210A (FIG. 2) with a second link 210B (FIG. 2) in the series, and another hinge 248BC (FIG. 3) can couple the second link 210B with a third link 210C in the series. The hinges 248 between adjacent links 210 can be in a closed position in the collapsed condition.

The collapsible wiring conduit 202 can be moved from the collapsed condition to the expanded condition in response to moving opposite ends of the collapsible wiring conduit 202 apart from one another. For example, the first end attachment 212 can be moved away from the second end attachment 214, such as by the linear actuator 200 moving the plunger 204 in the leftward direction of FIG. 3. Alternatively, the second end attachment 214 can be moved away from the first end attachment 212, such as by the linear actuator 200 moving the housing 216 with the cap 206 (or the cap 206 alone) toward in the rightward of FIG. 3.

Figure 4:
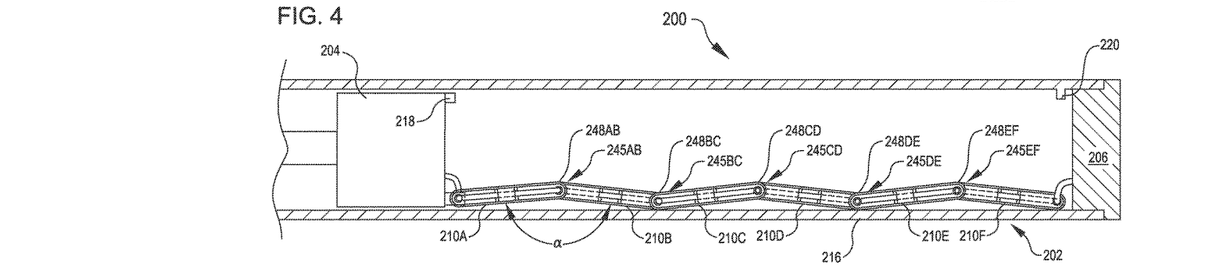
FIG. 4 is a side view of the linear actuator of FIGS. 2-3, showing the collapsible wiring conduit in an extended condition according to certain aspects.

FIG. 4 is a side view of the linear actuator 200 of FIGS. 2-3, with the collapsible wiring conduit 202 in the extended condition. In the extended condition, the links 210 can be oriented generally along the longitudinal axis of the housing 216.

The hinges 248 of the collapsible wiring conduit 202 can be fully opened in the extended condition, allowing the links 210 to reach across or span an axial length that is significantly larger than the axial length spanned when in the collapsed condition. In some aspects, a hinge 248 in a fully open position will align a pair of links 210 in a particular orientation. For example, the collapsible wiring conduit 202 can include stoppers 245 (individually referenced as 245AB, 245BC, 245CD etc. in FIG. 3). Each stopper 245 can constrain a hinge 248 from opening beyond a predetermined amount. For example, for the linear actuator 200 illustrated in FIG. 4, the stoppers 245 prevent the hinges 248 from opening beyond a position in which adjacent links 210 are oriented at an interior angle α of 170 degrees. Other predetermined amounts of rotation can also be used. In some aspects, increasing an angle of the predetermined amount may increase a difficulty of causing the links 210 to rotate back towards a collapsed condition. Reducing an angle of the predetermined amount can reduce a total length in the axial direction that the collapsible wiring conduit can reach. Non-limiting examples of stoppers 245 include torsion springs and interfering features (such as pairs of interlocking flanges or flanges and mating recesses).

In some aspects, the stoppers 245 on the hinges 248 can additionally or alternatively constrain the closed position, e.g., preventing the hinges 248 from closing more than a predetermined amount. As a non-limiting example, a stopper 245 can prevent a hinge 248 from closing beyond a position in which adjacent links 210 are oriented at an interior angle α of 5 degrees.

In some aspects, the links 210 are uniformly sized and have a common length. For example, in the linear actuator 200 illustrated in FIGS. 2-4, the length of each link is greater than a diameter or bore size of the housing 216. Sizing the links 210 in this way can prevent the links 210 from rotating past a closed position when rotating towards the collapsed condition. In some aspects, the length of each link 210 is less than or equal to a diameter of the bore size of the housing 216 (e.g., a non-limiting example of one such arrangement appears in FIGS. 10-12).

Various features can be utilized to constrain the links 210 and prevent over-rotation into positions in which one or more of the links 210 will not pivot correctly towards the open or the closed position. In addition to—or as alternatives to—sizing the length of the links to be longer than the diameter of the bore of the housing 216, the linear actuator 200 can include a first support 218, a second support 220, or both. With reference to FIG. 3, the first support 218 can prevent a first link 210A from rotating counterclockwise about a lower end (e.g., about the first end attachment 212) and into a position that is out of alignment for extending or retracting. The second support 220 can prevent a final link 210F from rotating clockwise about a lower end (e.g., about the second end attachment 214) and into a position that is out of alignment for extending or retracting. In some aspects, the support 218 or 220 can be coupled with a respective nearby movable element (such as the plunger 204 or the cap 206). Such an arrangement can cause the support 218 or 220 to move in conjunction with the links 210. Moving the support 218 or 220 can prevent the support 218 or 220 from obstructing the links 210 or inhibiting the links 210 from properly rotating to expand or contract the collapsible wiring conduit 202.

Figures 5, 6:
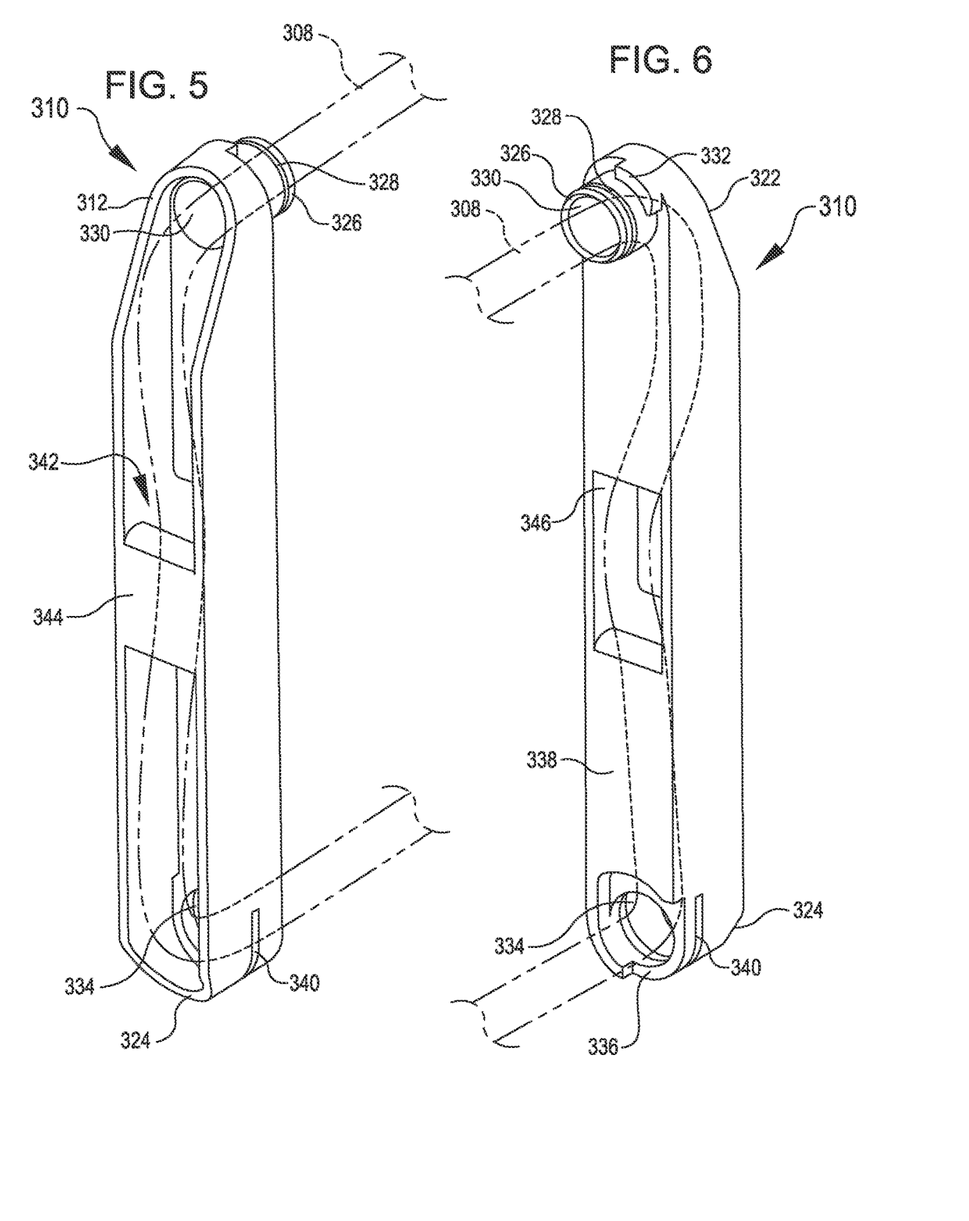
FIG. 5 is a front perspective view of an example of a link for a collapsible wiring conduit according to certain aspects.
FIG. 6 is a rear perspective view of the link of FIG. 5 according to certain aspects.

Different types of links 210 can be used in the collapsible wiring conduit 202 of the well system 100. FIGS. 5 and 6 are front and back perspective views of an example of a link 310. The link 310 can include a first end 322 and a second end 324 on opposite ends of a length of the link 310. The first end 322 can include a post 326, a passageway 330, and a flange 332. The post 326 can project from a back face 338 of the link 310. The post 326 can include a groove 328 on a perimeter surface of the post 326. The passageway 330 can pass through the first end 322 of the link 310. Wiring 308 can pass from a front to a rear of the link 310 through the passageway 330. The passageway 330 can pass through the post 326 if the post 326 is present. In some aspects (including some aspects in which the post 326 is not present), the passageway 330 may form an opening for receiving a pin or post for coupling the link 310 with another link. The flange 332 can project from a back face 338 of the link 310 and form part of a stopper for constraining movement of the link 310 relative to another link 310.

The second end 324 of the link 310 can include an opening 334, a recess 336, and a notch 340. The opening 334 can permit the wiring 308 to pass through the through opening 334 in some aspects. In some aspects, the opening 334 permits passage of a pin or post for coupling the link 310 to another link 310. The recess 336 can include an area that is recessed from the back face 338 of the link 310. The recess 336 can provide features or surfaces for interaction with the flange 332 or other stopper to constrain the link 310 from moving beyond a predetermined amount relative to another link 310 when coupled together. The notch 340 can extend inwardly into the link 310 along a length of the link 310.

A channel 342 can extend along the length of the link 310. The wiring 308 can be positioned or received in the channel 342. The channel can include a portion that is covered by a lock or wall 344. The lock or wall 344 can prevent the wiring 308 from sliding relative to the link 310. A window 346 can be provided opposite the lock 344 and increase ease of routing the wiring through the link 310.

Figure 7:
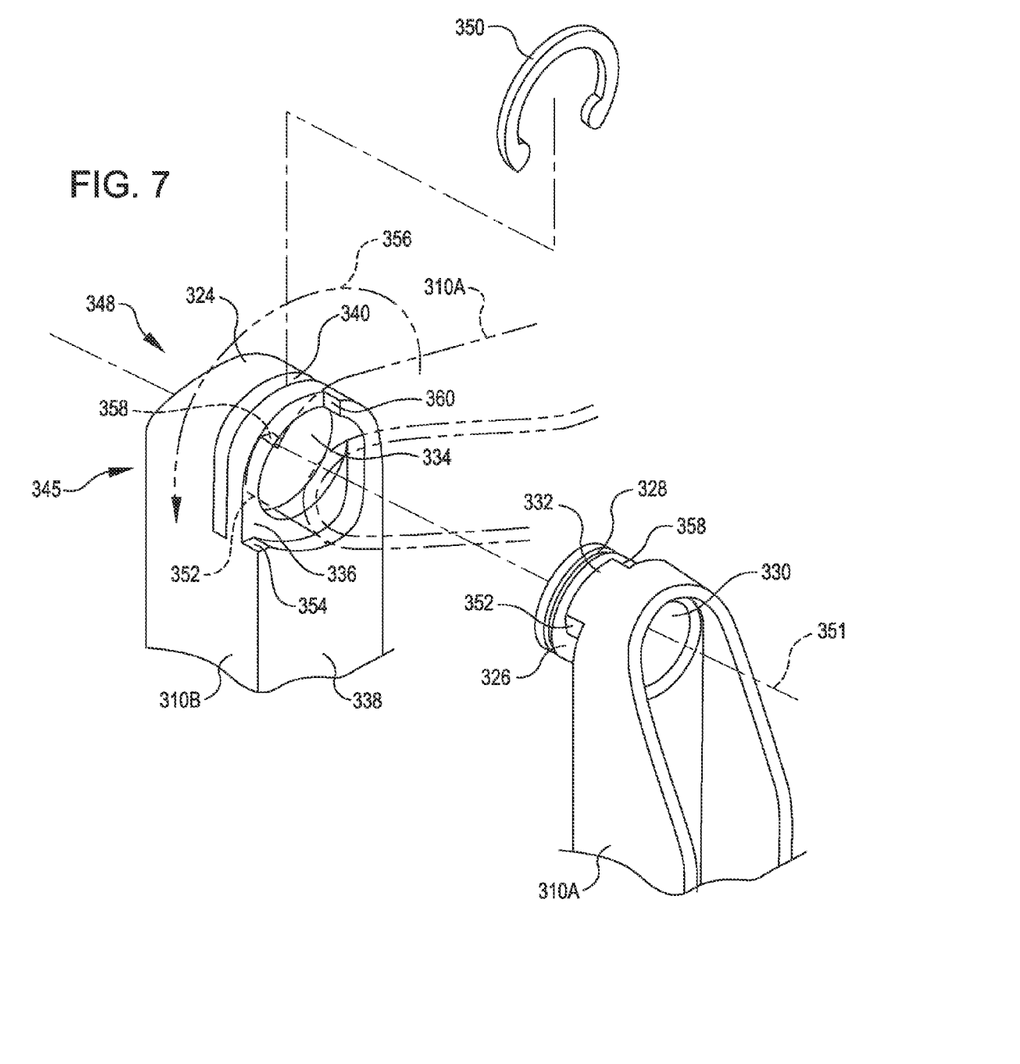
FIG. 7 is an exploded assembly view showing assembly of a hinge and operation of a stopper according to certain aspects.

FIG. 7 is an exploded assembly view showing assembly of a hinge 348 and operation of a stopper 345 according to some aspects. To assemble the hinge 348, the post 326 of a first link 310A is inserted into the opening 334 of a second link 310B (e.g., by moving the first link 310A from the position shown in solid lines in FIG. 7 to the position shown in phantom lines in FIG. 7). A clip 350 is inserted through the notch 340 in the second link 310B. The clip 350 engages the groove 328 on the post 326 of the first link 310A. The position of the clip 350 in the notch 340 and in engagement with the groove 328 secures the first link 310A to the second link 310B so that the links 310A, 310B can rotate relative to one another. In some aspects, the clip 350 is substantially flush with the second end 325 of the second link 310B when installed in the notch 340. For example, a flush arrangement may prevent the clip 350 from scratching or otherwise damaging an interior finish of a housing (such as 216 of FIG. 2) in which the hinge 348 is utilized.

The passageway 330 in the first link 310A can be aligned with the opening 334 in the second link 310B in the assembled hinge 348. Aligning the passageway 330 and the opening 334 can make the hinge 348 hollow and provide a path through the hinge through which wiring 308 (FIG. 6) can pass from one side to an opposite side of the hinge 348.

In some aspects, the links 310A and 310B joined by the hinge 348 can have back faces 338 that face one another when the hinge 348 is assembled. The hinge 348 can be assembled so that the back faces 338 can overlap during pivoting. The links 310A and 310B can be positioned side by side with respect to an axis 351 of rotation of the hinge 348. For example, the first link 310B can be moved during assembly of the hinge 348 along the axis 351 of rotation from a position that is offset from the second link 310B to a position that is abutting the second link 310B.

The flange 332 on the first link 310A can be received in the recess 336 of the second link 310B. Rotating the first link 310A and the second link 310B relative to one another in a first direction (e.g., rotating the second link 310 as shown by arrow 356) can cause a surface 352 on the flange 332 to come into contact with a surface 354 bounding an end of the recess 336. Engagement of the surface 352 on the flange 332 and the surface 354 of the recess 336 can prevent rotation of the links 310A and 310B beyond a predetermined amount. For example, the stopper 345 (comprising the surface 352 and the surface 354) can prevent the hinge 348 from opening beyond a predetermined amount, such as the interior angle α of 170 degrees described in an illustrative example above with reference to FIG. 4. In some aspects, the stopper 345 can additionally or alternatively include a closing surface 358 on an opposite side of the flange 332 and a closing surface 360 on an opposite end of the recess 336. The closing surfaces 358 and 360 can engage one another when the links 310A and 310B are rotated relative to one another in a second direction opposite the first direction (e.g., rotating the second link 310 opposite the direction shown by arrow 356). Such engagement of the closing surfaces 358 and 360 can prevent the links 310A and 310B from rotating past a closed position, such as beyond the interior angle α of 5 degrees described in an illustrative example above with reference to FIG. 3.

Figure 8:
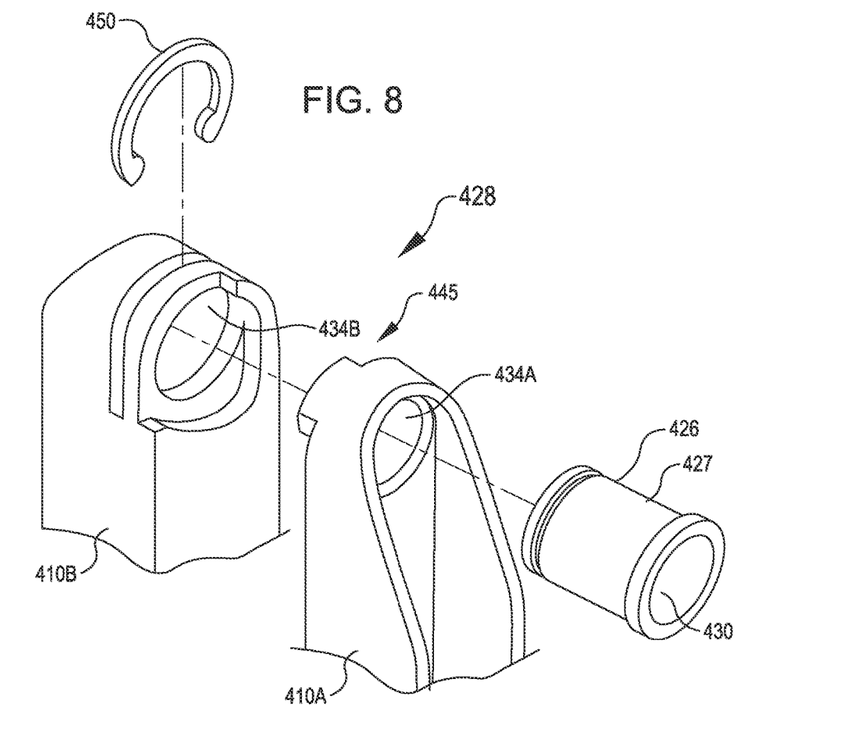
FIG. 8 is an exploded assembly view showing another example of links for a collapsible wiring conduit according to certain aspects.

FIG. 8 is an exploded assembly view showing another example of links 410 that can be used in a collapsible wiring conduit. A pin 427 distinct from the links 410 may couple the links 410 together. The links 410 (individually referenced in FIG. 8 as 410A and 410B) can each have an opening 434 (individually referenced in FIG. 8 as 434A and 434B). The pin 427 can be inserted through the openings 434A and 434B to form a hinge 428. For example, the pin 427 may include a post 426 that may be secured by a clip 450 in a manner similar to that described with reference to like-named features of FIG. 7. The pin 427 can have a passageway 430 passing through a length of the pin 427. The passageway 430 in the pin 427 can make the hinge 428 hollow when assembled. The passageway 430 may be sized to permit wiring to pass through the hollow hinge 428. In some aspects, the links 410 can include features of a stopper 445 similar to the stopper 345 described with reference to FIG. 7.

Figure 9:
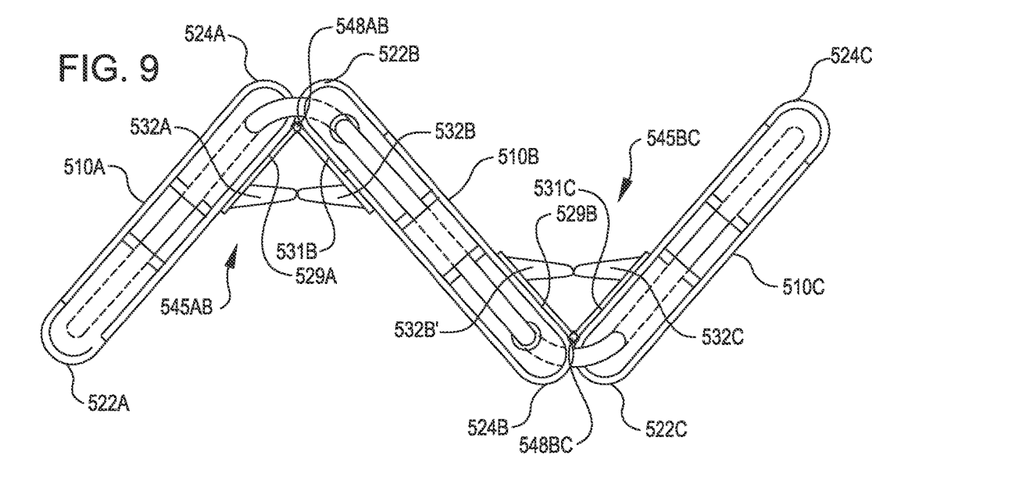
FIG. 9 is side view showing yet another example of links for a collapsible wiring conduit according to certain aspects.

FIG. 9 is side view showing yet another example of links 510 that can be used in a collapsible wiring conduit. The links 510 can be coupled by hinges 548 having sides 529 and 531 that fold against one another in the absence of constraints. In some aspects, the links 510 may include stoppers 545. For example, the stopper 545 may include one or more flanges 532 that project transversely from either or both of the sides 529 and 531. In some aspects, one or more such flanges 532 may interfere with a housing when the hinge 548 is opening and prevent the hinge 548 from opening past a predetermined amount. In some aspects, the flanges 532 can additionally or alternatively constrain the sides 529 and 531 from folding completely against one another. For example, each flange 532 may interfere with another feature (such as another flange 532 or a surface of an adjacent link 510) when the hinge 548 is closing and prevent the hinge 548 from closing past a predetermined amount. In some aspects, the shape or arrangement (or both) of the ends 522 and 524 of the links 510 may additionally or alternatively prevent the hinges 548 from opening beyond a predetermined amount. For example, a stopper 545AB may include ends 524A and 522B of coupled links 510A and 510B that extend beyond the hinge 548AB and interfere with one another when the hinge 548AB is opened to the predetermined amount. Although FIG. 9 illustrates links 510 having flanges 532 in addition to ends 522 and 524 shaped to interfere with one another at a predetermined opened amount, in some aspects, one or both of these features (or any type of stopper 545) may be omitted. The links 510 may be hollow for carrying wiring 508. Additionally or alternatively, the links 510 include other features for otherwise supporting wiring 508.

In some aspects, a collapsible wiring conduit can efficiently utilize length in a tool string. For example, a collapsible wiring conduit can provide a favorable extension ratio in that the collapsed condition can occupy a volume having a longitudinal length that is significantly smaller than a length of a volume that can be spanned by the extended condition. As an illustrative example, in a bore with a diameter of approximately 3 inches, a set of ten links may occupy approximately 2 inches of length in a collapsed condition and reach approximately 24 inches of length in an extended condition, resulting in an extension ratio of approximately 1:12 and a total change in extension of approximately 22 inches. In some aspects, reducing a size of the bore may reduce an efficiency with which length in a tool string is utilized (e.g., reduce an extension ratio or total change in extension). For example, if the diameter of the bore is reduced by a factor of two (e.g., if a bore with a diameter of approximately 1.5 inches is used instead of the diameter of approximately 3 inches of the previous illustrative example), then links may be shorter to fit in the bore in the collapsed condition. As a result, twice as many links (e.g., twenty instead of ten) may be used to obtain a comparable total amount of extension (e.g., 24 inches) and occupy a volume twice as long in the collapsed condition (e.g., 4 inches instead of 2 inches). These changes result in decreases in the extension ratio (e.g., decrease from 1:12 to 1:6) and in the total change in extension (e.g., decrease from 22 inches to 20 inches). Reducing a size or length of links can also pose other challenges, such as an increased difficulty of assembly, or a sharper bending radius for wiring routed along the links.

Figure 10:
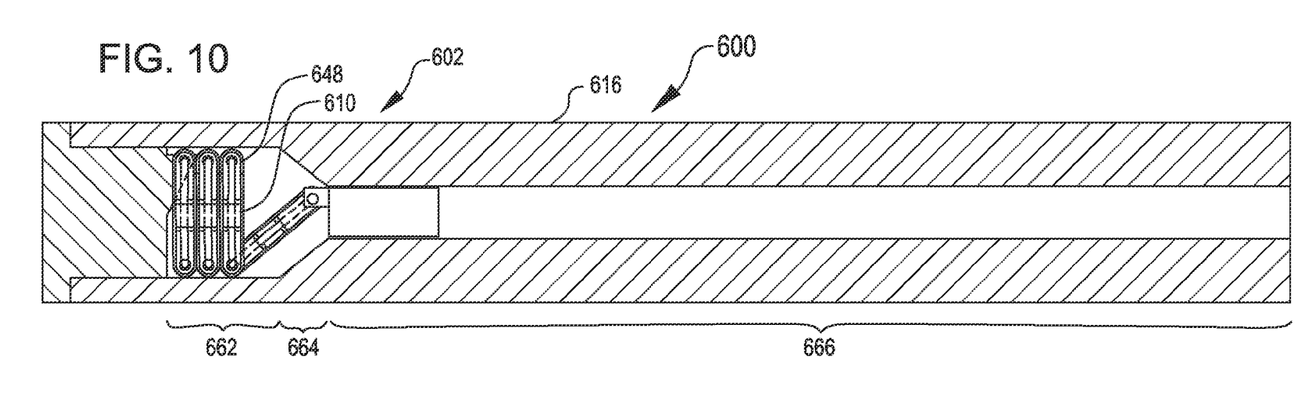
FIG. 10 illustrates another example of a linear actuator with a collapsible wiring conduit in a collapsed condition according to certain aspects.

In some aspects, a non-uniform bore size can mitigate difficulties or inefficiencies posed by reduced bore sizes. FIG. 10 illustrates another example of a linear actuator 600 with a collapsible wiring conduit 602. The linear actuator 600 has a housing 616 with a non-uniform bore size. The housing 616 has a first section 662, a second section 664 and a third section 666. The first section 662 has a bore sized to accommodate the links 610 of the collapsible wiring conduit 602 in the collapsed condition (e.g., with hinges 648 in the closed position). For example, the links 610 in the first section 662 can be in a substantially upright position or aligned generally transverse to the longitudinal direction of the housing 616.

Figure 11:
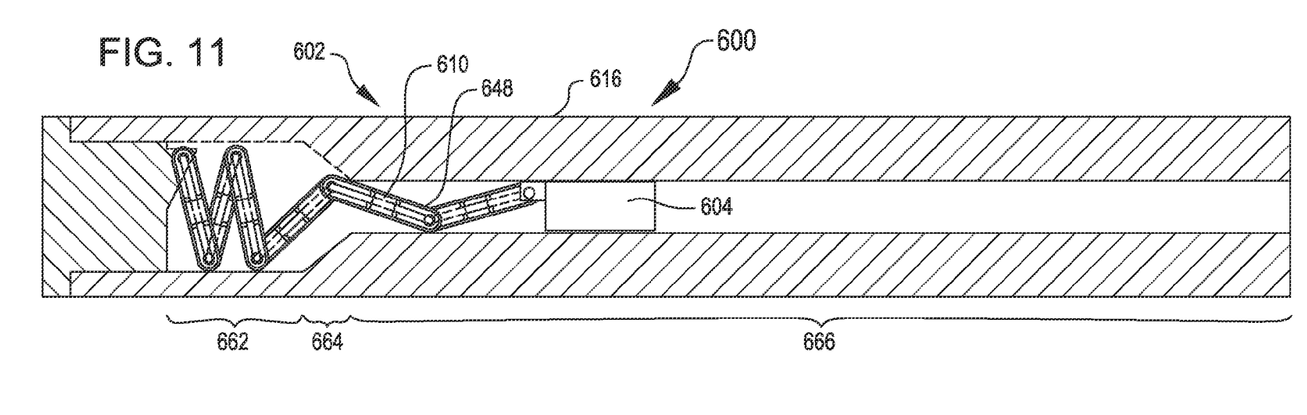
FIG. 11 illustrates the linear actuator of FIG. 10 with the collapsible wiring conduit in an intermediate position between the collapsed condition and an expanded condition according to certain aspects.

FIG. 11 illustrates the linear actuator 600 with the collapsible wiring conduit 602 in an intermediate position between the collapsed condition and the expanded condition. The third section 666 can have a bore size that is large enough to accommodate the links 610 in a turned position (e.g., when hinges 648 are an open position). The bore size in the third section 666 can be too small to accommodate the links 610 in an upright position (e.g., when hinges 648 are closed), or when the links 610 are aligned generally transverse to the longitudinal direction of the housing 616. The second section 664 can taper between the first section and the third section in bore size.

A plunger 604 connected with a first end (e.g., the right end) of the collapsible wiring conduit 602 can be moved along the third section 666 of the housing 616 and away from the first section 662. Movement of the plunger 604 can pull adjacent links 610 apart and pull the hinges 648 into an open position. The taper of the second section 664 can direct the links into the third section 666 of the housing 616 and cause the hinges 648 to shift into the open position. A second end (e.g., the left end) of the collapsible wiring conduit 602 can be anchored to pivot from a position that is radially outward relative to the bore of the third section 666. Such an arrangement may cause the collapsible wiring conduit 602 to have at least one link 610 that is constrained to be aligned at least partially transverse to a central axis of the bore of the third section 666. The presence of a link 610 constrained to be aligned at least partially transverse to a central axis of the bore of the third section 666 may prevent the links 610 of the collapsible wiring conduit 602 from extending into a configuration in which all of the links 610 are aligned straight line. Preventing the links 610 from extending into a straight line can increase a likelihood that the links 610 will rotate toward the collapsed condition in response to the plunger 604 being moved toward the first section 662. In some aspects, the collapsible wiring conduit 602 may be utilized without stoppers described elsewhere herein. For example, in lieu of stoppers, a link 610 that is constrained to be aligned at least partially transverse to a central axis of the bore of the third section 666 may provide a constraint for aligning the links 610 to facilitate collapsing. In some aspects, the geometry of the taper of the second section 664 can also provide a constraint for aligning for aligning the links 610 to facilitate collapsing.

Figure 12:
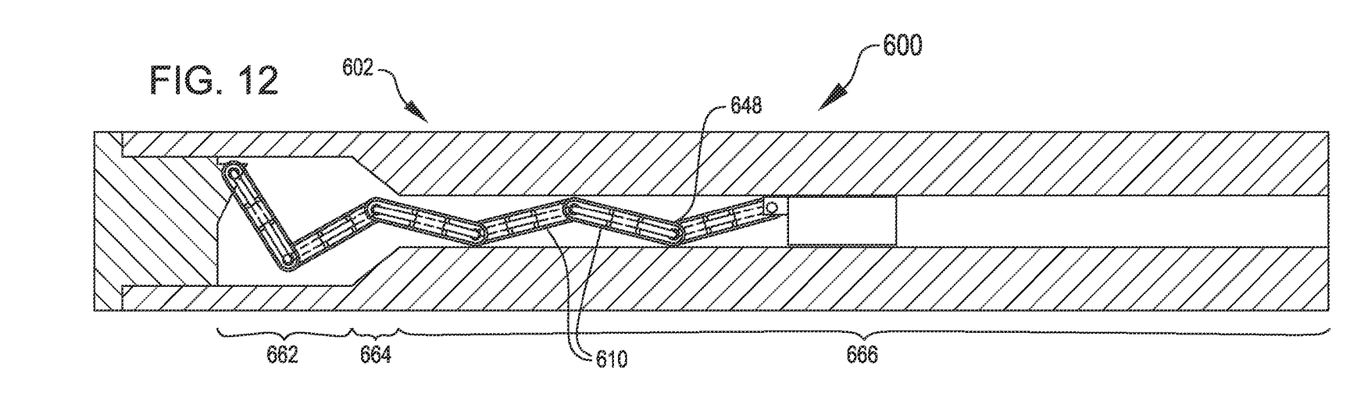
FIG. 12 illustrates the linear actuator of FIGS. 10 and 11 with a collapsible wiring conduit in the extended condition according to certain aspects.

FIG. 12 illustrates the linear actuator 600 with the collapsible wiring conduit 602 in the extended position. Most or all of the links 610 can be positioned in the third section 666 when the hinges 648 are in the open position. FIGS. 10-12 illustrate that a smaller-bore section 666 can be supplemented by a larger-bore storage section 662 to allow use of links 610 that would otherwise be too large to fit within the smaller-bore section 666 in the collapsed condition. Such an arrangement can mitigate difficulties or inefficiencies posed by use of reduced bore sizes.

Figure 13:
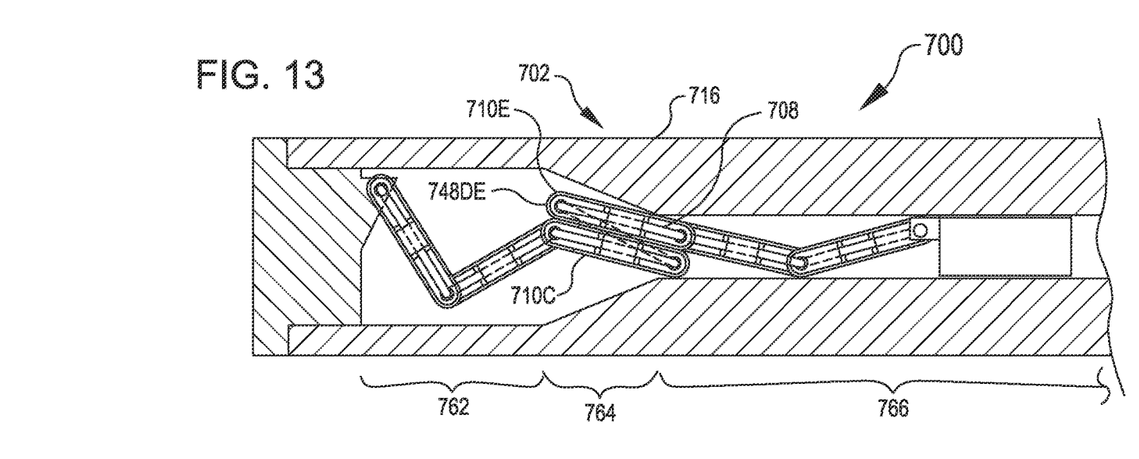
FIG. 13 illustrates a linear actuator with a collapsible wiring conduit having links that are improperly fed through the bore of a housing according to certain aspects.

FIG. 13 illustrates a linear actuator 700 with a collapsible wiring conduit 702 having links 710C-710E that are improperly fed through the bore of the housing 716. In some arrangements, such improper feeding may occur due to adjacent links 710 failing to open at the hinge 748 connecting the adjacent links 710. Various approaches can be employed to reduce the risk of such improper feeding. In one example, the links 710 can be sized to have lengths that are greater than the diameter of the bore of the storage section 762 of the bore of the housing. Such sizing may constrain the links 710 and make the links 710 more likely to stretch apart at the hinge 748 when being fed into a smaller bore. Additionally or alternatively, the geometry of the taper (such as the length or severity of the taper of the tapered section 764) can be adjusted to provide further constraints and reduce a risk of improper feeding. As a further option, other constraints such as supports described above with respect to FIGS. 2 and 3 (supports 218 and 220) can be utilized to constrain the links 710. As a further alternative, stoppers on the closing side of the links (e.g., surfaces 360 and 358 described above with respect to FIG. 7) can be utilized to constrain the links 710. In some aspects, the stiffness of the wiring 708 routed through the collapsible wiring conduit 702 can provide an extra measure of torque during extension to urge the hinges 748 to open and prevent improper feeding.

In some aspects, downhole tool, a system, or a method is provided according to one or more of the following examples or according to some combination of the elements thereof. In some aspects, a tool or a system described in one or more of these examples can be utilized to perform a method described in one of the other examples.

Example #1

Provided can be a collapsible wiring conduit, comprising: (A) a plurality of links hingedly coupled together in a series, the plurality of links being movable in an longitudinal direction between a collapsed condition and an extended condition and being shaped for supporting wiring for traversing a variable longitudinal length in a downhole tool; and (B) a plurality of hinges, each hinge in the plurality of hinges coupling a link of the plurality of links with an adjacent link in the series of the plurality of links.

Example #2

Provided can be the collapsible wiring conduit of Example #1, further comprising wiring that is routed link-to-link along lengths of the plurality of links.

Example #3

Provided can be the collapsible wiring conduit of Example #2 (or any of Examples #1-2), wherein at least one hinge of the plurality of hinges is hollow to receive the wiring through the hollow hinge.

Example #4

Provided can be the collapsible wiring conduit of Example #1 (or any of Examples #1-3), wherein at least one hinge of the plurality of hinges comprises: (A) an opening through a first link of the plurality of links; and (B) a post projecting from a second link of the plurality of links, the second link being adjacent the first link in the series, the post being engaged in the opening so that the first link and second link are rotatable relative each other.

Example #5

Provided can be the collapsible wiring conduit of Example #1 (or any of Examples #1-4), wherein at least one hinge of the plurality of hinges comprises: (A) a first opening through a first link of the plurality of links; (B) a second opening through a second link of the plurality of links, the second link being adjacent the first link in the series; and (C) a post or pin extending into the first opening and the second opening.

Example #6

Provided can be the collapsible wiring conduit of Example #1 (or any of Examples #1-5), further comprising a plurality of stoppers, each stopper of the plurality of stoppers arranged for constraining a hinge of the plurality of hinges in the extended condition from opening beyond a predetermined amount.

Example #7

Provided can be the collapsible wiring conduit of Example #6 (or any of Examples #1-6), wherein at least one stopper of the plurality of stoppers comprises: (A) a first flange extending from a first link of the plurality of links; and (B) an interfering feature of a second link of the plurality of links, the second link being adjacent the first link in the series and hingedly coupled with the first link by a hinge of the plurality of hinges, the interfering feature comprising a second flange extending from the second link or a recess in the second link, the interfering feature arranged to engage the first flange in interfering engagement to prevent the hinge from opening the predetermined amount.

Example #8

Provided can be the collapsible wiring conduit of Example #6 (or any of Examples #1-7), wherein the predetermined amount comprises a position at which links are 170 degrees apart.

Example #9

Provided can be the collapsible wiring conduit of Example #1 (or any of Examples #1-8), wherein at least one hinge of the plurality of hinges couples a pair of links of the plurality of links that are positioned side by side with respect to an axis of rotation of the hinge.

Example #10

Provided can be a downhole assembly (which may incorporate features of any of Examples #1-9), comprising: (A) a linear actuator; (B) a first object and a second object positionable between a first distance apart and a second distance apart in an axial direction by the linear actuator; (C) a collapsible wiring conduit coupled at a first side with the first object and at a second side with the second object, the collapsible wiring conduit comprising: (i) a plurality of links hingedly coupled together in a series, the plurality of links being movable within a housing in the axial direction between a collapsed condition and an extended condition; and (ii) a plurality of hinges, each hinge in the plurality of hinges coupling a link of the plurality of links with an adjacent link in the series of the plurality of links; and (D) wiring that is routed from link-to-link along the plurality of links so as to couple the first object and the second object in the collapsed condition and the extended condition for at least one of power transmission or data transmission.

Example #11

Provided can be the downhole assembly of Example #10, wherein the collapsible wiring conduit further comprises: (iii) a plurality of stoppers, each stopper of the plurality of stoppers arranged for constraining a hinge of the plurality of hinges in the extended condition from opening to a predetermined amount.

Example #12

The downhole assembly of Example #10 (or any of Examples #10-11), wherein the first object further comprises a first structure shaped to constrain the first side of the collapsible wiring conduit from rotating past a perpendicular orientation relative to a longitudinal axis of the housing when the first side of the collapsible wiring conduit is moving into the collapsed condition from the extended position.

Example #13

Provided can be the downhole assembly of Example #10 (or any of Examples #10-12), wherein at least one link of the plurality of links has a length greater than an inner diameter of the housing so as to constrain the link from rotating past a perpendicular orientation relative to a longitudinal axis of the housing when the link is moving into the collapsed condition from the extended position.

Example #14

Provided can be the downhole assembly of Example #10 (or any of Examples #10-13), wherein at least one link of the plurality of links has a length less than an inner diameter of the housing.

Example #15

Provided can be the downhole assembly of Example #10 (or any of Examples #10-14), wherein the housing comprises: (i) a first section sized to accommodate the plurality of links in the collapsed condition; (ii) a third section sized to accommodate at least some of the links in the extended condition, the third section having a smaller inner diameter than the first section; and (iii) a second section tapering between the first section and third section.

Example #16

Provided can be a collapsible wiring conduit (which may incorporate features of any of Examples #1-15), comprising:

(A) a plurality of links, each link of the plurality of links comprising (i) a post having a passageway extending through the post, (ii) an opening, (iii) a flange, and (iv) a recess; (B) a plurality of hinges, each hinge of the plurality of hinges associated with a pair of links from the plurality of links, the hinge comprising the post of one of the links of the pair being aligned within the opening of the other of the links of the pair; and (C) a plurality of stoppers, each stopper of the plurality of stoppers associated with a hinge of the plurality of hinges and the pair of links associated with the hinge, the stopper comprising the flange of one of the links of the pair being aligned within the recess of the other of the links of the pair; wherein the plurality of links are arranged to support wiring for connecting objects positioned a variable distance apart within a downhole tool.

Example #17

Provided can be the collapsible wiring conduit of Example #16, wherein each link of the plurality of links further comprises the post positioned at a first end of the link and the opening positioned at a second, opposite end of the link.

Example #18

Provided can be the collapsible wiring conduit of Example #16 (or any of Examples #16-17), wherein each hinge further comprises a clip engaged with the post of the one of the links of the pair, the clip positioned through a notch in the other of the links of the pair for securing the post within the opening.

Example #19

Provided can be the collapsible wiring conduit of Example #16 (or any of Examples #16-18), wherein each link of the plurality of links further comprises a back face, wherein the flange projects outward from the back face and the recess projects inward from the back face.

Example #20

Provided can be the collapsible wiring conduit of Example #16 (or any of Examples #16-19), wherein at least one link of the plurality of links comprises at least one of: (i) a channel extending along a length of the link and shaped to support the wiring within the channel; or (ii) a lock positioned to prevent sliding of the wiring relative to the link.

The foregoing description, including illustrated aspects and examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:
1. A collapsible wiring conduit, comprising:
 a plurality of links hingedly coupled together in a series, the plurality of links being movable in an longitudinal direction between a collapsed condition and an extended condition and being shaped for supporting wiring for traversing a variable longitudinal length in a downhole tool;
 a plurality of hinges, each hinge in the plurality of hinges coupling a link of the plurality of links with an adjacent link in the series of the plurality of links; and
 wiring that is routed link-to-link along lengths of the plurality of links, wherein at least one hinge of the plurality of hinges is hollow to receive the wiring through the hollow hinge.

2. The collapsible wiring conduit of claim 1, wherein at least one hinge of the plurality of hinges comprises:
 an opening through a first link of the plurality of links; and
 a post projecting from a second link of the plurality of links, the second link being adjacent the first link in the series, the post being engaged in the opening so that the first link and second link are rotatable relative each other.

3. The collapsible wiring conduit of claim 1, wherein at least one hinge of the plurality of hinges comprises:
 a first opening through a first link of the plurality of links;
 a second opening through a second link of the plurality of links, the second link being adjacent the first link in the series; and
 a post or pin extending into the first opening and the second opening.

4. The collapsible wiring conduit of claim 1, further comprising:
 a plurality of stoppers, each stopper of the plurality of stoppers arranged for constraining a hinge of the plurality of hinges in the extended condition from opening beyond a predetermined amount.

5. The collapsible wiring conduit of claim 4, wherein at least one stopper of the plurality of stoppers comprises:
 a first flange extending from a first link of the plurality of links; and
 an interfering feature of a second link of the plurality of links, the second link being adjacent the first link in the series and hingedly coupled with the first link by a hinge of the plurality of hinges, the interfering feature comprising a second flange extending from the second link or a recess in the second link, the interfering feature arranged to engage the first flange in interfering engagement to prevent the hinge from opening the predetermined amount.

6. The collapsible wiring conduit of claim 4, wherein the predetermined amount comprises a position at which links are 170 degrees apart.

7. A downhole assembly, comprising:
 a linear actuator;
 a first object and a second object positionable between a first distance apart and a second distance apart in an axial direction by the linear actuator;
 a collapsible wiring conduit coupled at a first side with the first object and at a second side with the second object, the collapsible wiring conduit comprising:
 (i) a plurality of links hingedly coupled together in a series, the plurality of links being movable within a housing in the axial direction between a collapsed condition and an extended condition; and
 (ii) a plurality of hinges, each hinge in the plurality of hinges coupling a link of the plurality of links with an adjacent link in the series of the plurality of links; and
 wiring that is routed from link-to-link along the plurality of links so as to couple the first object and the second object in the collapsed condition and the extended condition for at least one of power transmission or data transmission;
 wherein at least one link of the plurality of links has a length greater than an inner diameter of the housing so as to constrain the link from rotating past a perpendicular orientation relative to a longitudinal axis of the housing when the link is moving into the collapsed condition from the extended position.

8. The downhole assembly of claim 7, wherein the collapsible wiring conduit further comprises:
(iii) a plurality of stoppers, each stopper of the plurality of stoppers arranged for constraining a hinge of the plurality of hinges in the extended condition from opening to a predetermined amount.

9. The downhole assembly of claim 7, wherein the first object further comprises a first structure shaped to constrain the first side of the collapsible wiring conduit from rotating past a perpendicular orientation relative to a longitudinal axis of the housing when the first side of the collapsible wiring conduit is moving into the collapsed condition from the extended position.

10. A downhole assembly, comprising:
a linear actuator;
a first object and a second object positionable between a first distance apart and a second distance apart in an axial direction by the linear actuator;
a collapsible wiring conduit coupled at a first side with the first object and at a second side with the second object, the collapsible wiring conduit comprising:
(i) a plurality of links hingedly coupled together in a series, the plurality of links being movable within a housing in the axial direction between a collapsed condition and an extended condition; and
(ii) a plurality of hinges, each hinge in the plurality of hinges coupling a link of the plurality of links with an adjacent link in the series of the plurality of links; and
wiring that is routed from link-to-link along the plurality of links so as to couple the first object and the second object in the collapsed condition and the extended condition for at least one of power transmission or data transmission;
wherein the housing comprises:
a first section sized to accommodate the plurality of links in the collapsed condition;
a third section sized to accommodate at least some of the links in the extended condition, the third section having a smaller inner diameter than the first section; and
a second section tapering between the first section and third section.

11. The downhole assembly of claim 10, wherein at least one link of the plurality of links has a length less than an inner diameter of the housing.

12. A collapsible wiring conduit, comprising:
a plurality of links, each link of the plurality of links comprising (i) a post having a passageway extending through the post, (ii) an opening, (iii) a flange, and (iv) a recess;
a plurality of hinges, each hinge of the plurality of hinges associated with a pair of links from the plurality of links, the hinge comprising the post of one of the links of the pair being aligned within the opening of the other of the links of the pair; and
a plurality of stoppers, each stopper of the plurality of stoppers associated with a hinge of the plurality of hinges and the pair of links associated with the hinge, the stopper comprising the flange of one of the links of the pair being aligned within the recess of the other of the links of the pair;
wherein the plurality of links are arranged to support wiring routed through at least one of the passageways of at least one of the posts of at least one of the plurality of links for connecting objects positioned a variable distance apart within a downhole tool.

13. The collapsible wiring conduit of claim 12, wherein each link of the plurality of links further comprises the post positioned at a first end of the link and the opening positioned at a second, opposite end of the link.

14. The collapsible wiring conduit of claim 12, wherein each hinge further comprises a clip engaged with the post of the one of the links of the pair, the clip positioned through a notch in the other of the links of the pair for securing the post within the opening.

15. The collapsible wiring conduit of claim 12, wherein each link of the plurality of links further comprises a back face, wherein the flange projects outward from the back face and the recess projects inward from the back face.

16. The collapsible wiring conduit of claim 12, wherein at least one link of the plurality of links comprises at least one of:
a channel extending along a length of the link and shaped to support the wiring within the channel; or
a lock positioned to prevent sliding of the wiring relative to the link.

* * * * *